Dec. 12, 1967  M. PIGET  3,357,731
BRACKET FOR ASSEMBLING TWO METAL PROFILE PIECES
WITHOUT WELDING OR RIVETTING
Filed Jan. 11, 1965  2 Sheets-Sheet 1
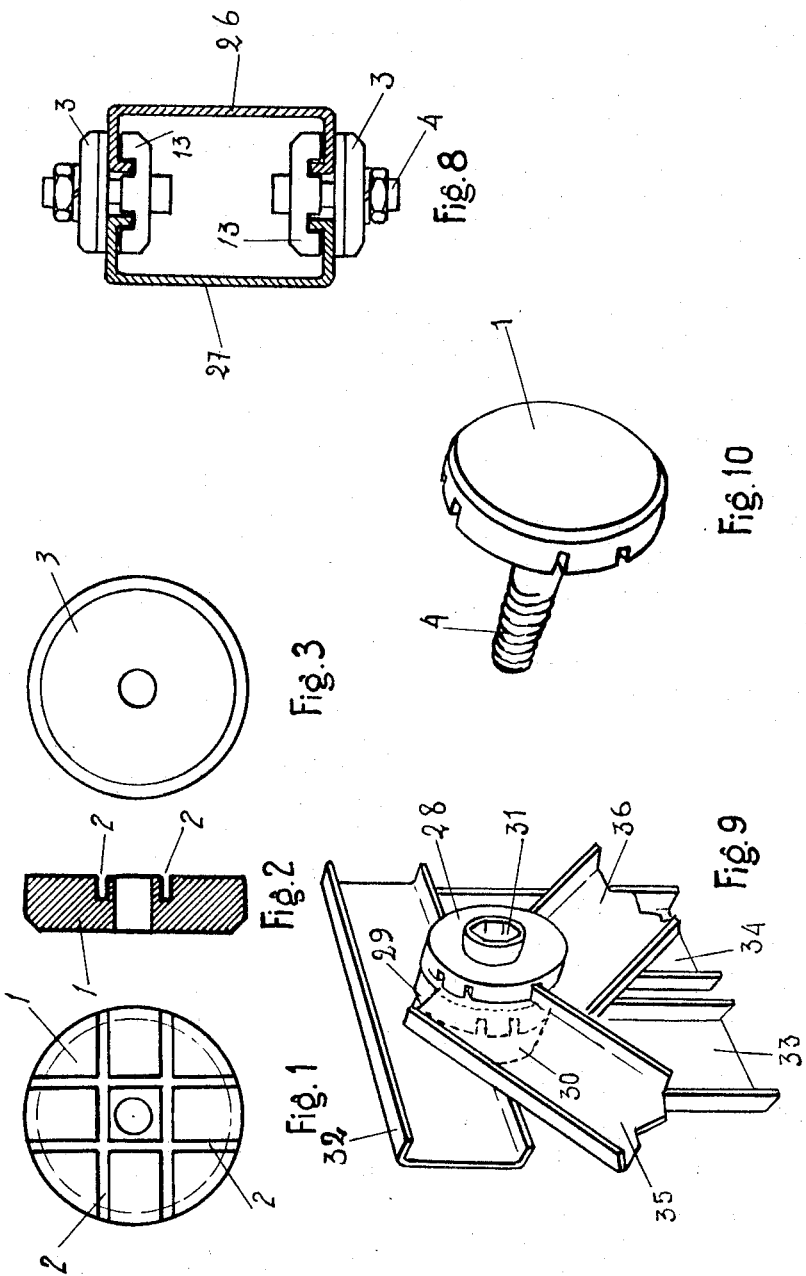
INVENTOR
MAURICE PIGET
By
Lane, Aitken, Dunner & Ziems
ATTORNEYS Dec. 12, 1967  M. PIGET  3,357,731
BRACKET FOR ASSEMBLING TWO METAL PROFILE PIECES
WITHOUT WELDING OR RIVETTING
Filed Jan. 11, 1965  2 Sheets-Sheet 2
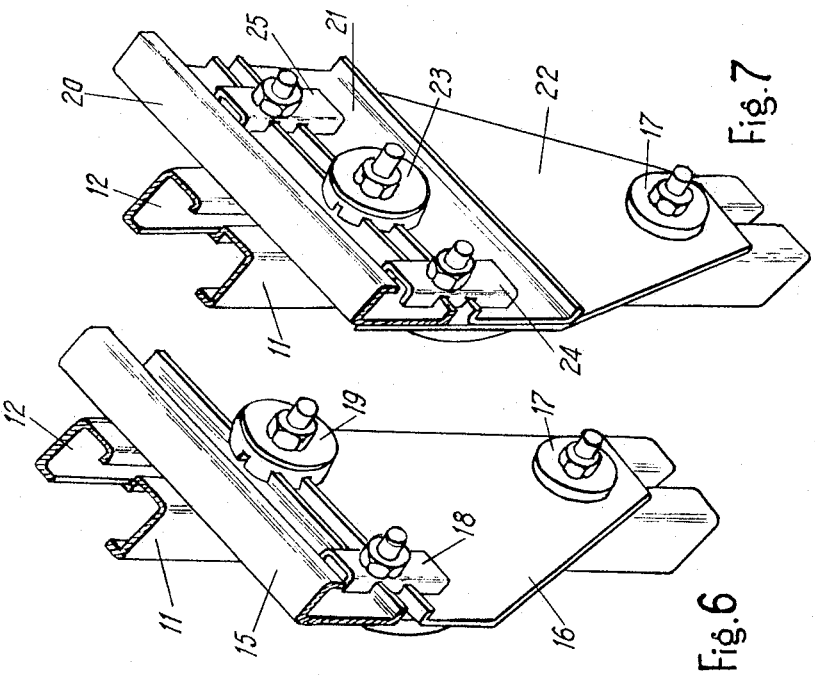
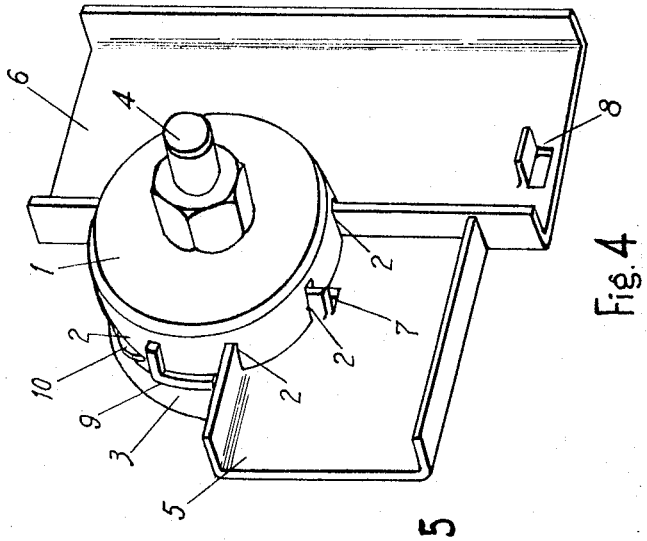
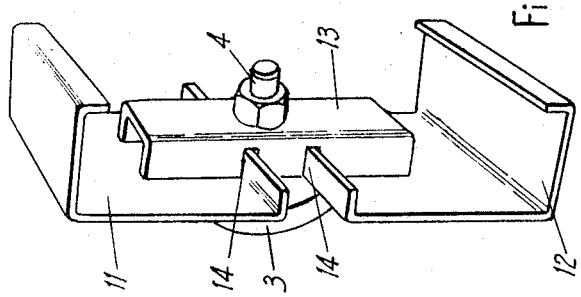
INVENTOR
MAURICE PIGET
BY Lane, Aitken, Dunner & Ziems
ATTORNEYS United States Patent Office 3,357,731
Patented Dec. 12, 1967

3,357,731
BRACKET FOR ASSEMBLING TWO METAL PROFILE PIECES WITHOUT WELDING OR RIVETTING
Maurice Piget, 2 Rue Breuvery, Saint-Germain-en-Laye, France
Filed Jan. 11, 1965, Ser. No. 424,473
Claims priority, application France, Jan. 31, 1964, 962,272
7 Claims. (Cl. 287—189.36)

The present invention relates to a bracket for assembling metal profile pieces without welding or piercing the same.

The assembly of two metal profile pieces forming between them a certain angle is usually carried out by means of plate elements in triangular form, known as brackets, the sides of which adjacent to the angle at the apex are joined to each of two profile pieces by welding, rivets or bolts. With such a bracket it is not possible after assembly to vary the position of one or the other of the profile pieces in relation to the other.

The device of the present invention which concerns the assembly of two elements of a profile piece comprising at least one angled part, is constituted of two shell members joined by a central bolt, one of the two shell members, known as the carrier member, and which is thicker than the other, having on its internal face two grooves forming between them the angle at which the two profile pieces are assembled. In each of the grooves the angled part of one of the two elements to be assembled is engaged. The other shell member, known as the tightening member, and which is smooth on both its faces, is pressed by the action of tightening the central bolt against the faces opposite to those having the angled parts.

In the particular case of orthogonal assembly, the grooves of the carrier shell are perpendicular, a preferred embodiment comprising two groups of two equidistant parallel grooves, intersecting at a right angle, the axis of the bolt passing through the square formed by the intersecting of the four grooves.

For the extension of the friction surface between the carrier shell and each of the two profile pieces to be assembled, mounting slots are made in the web of the two profile elements to provide projecting tongues which engage in the free grooves of the sector common to the carrier shell and to the webs of the two profile elements.

For the extension of the friction surface between the carrier shell and the adjuster shell, in the dead sector between the two profile pieces to be assembled, tightening corners irons are disposed between the two shells and comprised of small corner iron elements, one arm of which is introduced in the free groove of the carrier shell whereas the other is clamped between the two shells. In a variation, a magnetised contact of predetermined thickness is substituted at the corner iron element, between the two shells.

In the application of the idea of the invention to two parallel profile elements the carrier shell is given a simplified structure by reducing it to a cross-piece formed by a U-shaped stamping cut with a tool on the two edges of the same to provide two parallel grooves spaced from each other by the amount of the gap between the two elements to be assembled.

The device of the invention can be combined with a triangulation plate in the case of orthogonal or oblique assembly on a pole of two profile elements, or even of one single element.

Using the device of the invention, by which it is possible to assemble hot rolled metal together or with profile pieces by the cold process, comprising an angled part which engages in one of the grooves of the carrier shell, it is also possible to assemble symmetrical or asymmetrical profile pieces which have at least one angled part, to obtain assemblies of mechanical characteristics comparable to those of a tube, such carrier frameworks being capable of taking filler panels or they can even form the support for flooring.

It should be noted that the carrier shell member can at the same time constitute the head of the assembly bolt.

Furthermore, it is possible to dispose on the said assembly bolt a series of carrier shell members, the grooves made in the one forming a determined angle with the grooves made in the adjacent one, the series terminating by means of a tightening shell member. Such assembly finds application in carrying out a trellis work, by the assembly on the upper and lower members of vertical and diagonal members constituting the bars of the trellis.

The invention will now be described with reference to the attached drawings, which are not intended to be restrictive.

FIGURE 1 is a view of the internal face of the carrier shell member in accordance with the invention suitable for the assembly of two orthogonal profile pieces.

FIGURE 2 is a cross-section through the axis of the carrier shell.

FIGURE 3 is a view of one of the two faces of the shell member known as the tightening member.

FIGURE 4 is a perspective view of the assembly of two orthogonal profile pieces, the webs of which have slots determining the outlet of the tongues which engage in the free grooves of the sector common to the carrier shell and to the webs of the two elements, showing the tightening corner irons or magnetised contacts which are clamped between the two shell members in the dead sector between the profile pieces.

FIGURE 5 is a perspective view of the assembly of two parallel elements, each with an angled part, making use of a simplified carrier shell device, constituted of a crosspiece stamped out into U-shape.

FIGURE 6 shows a perspective view of the oblique assembly of a profiled U-shaped piece with angled part of two U-shaped elements. Here use is made of three brackets of the invention, one having a double carrier shell and the whole comprising furthermore a triangulation plate.

FIGURE 7 is a perspective view of the orthogonal assembly, triangulated on a pole, of a unit of two parallel profile elements, the upper profile piece being U-shaped with angled part, the lower profile piece being a simple U-shape without angled part, use being made of four brackets of the invention, one having a double carrier shell, together with a triangulation plate.

FIGURE 8 is a section through an assembly of two U-shaped profile pieces comprising two angled parts, constituting a unit having mechanical characteristics comparable to those of a tube.

FIGURE 9 is a perspective view of the assembly, on the upper member of a trellis work, of two vertical and two diagonal members constituting the bars of the trellis.

FIGURE 10 is a perspective view of a carrier shell forming at the same time the head of the assembly bolt.

In FIGURES 1 to 4, the reference 1 indicates the carrier shell member with four grooves 2, 3 designates the tightening shell member, 4 the assembly bolt, 5 and 6 two profile elements which in FIGURE 4 are assembled orthogonally, 7 and 8 designate the slots made in the mounting in the webs of the two profile pieces and which create the tongues inserted into the two free grooves of the carrier shell, and 9 designates a tightening corner iron constituted of a small corner iron element, one arm of which is clamped between the two shell members in the dead sector between the two elements to be assembled. The reference 10 designates a magnetized contact playing the same part as the tightening corner iron, that is to say, extending to the dead sector the friction surface between the carrier shell and the tightening shell.

In FIGURE 5, two parallel elements 11 and 12 are shown assembled together by brackets placed at the points of intersection with the angled parts of the two profile pieces, i.e. the diagonal members of a supposed trellis, the said brackets being constituted of a carrier shell reduced to a cross-piece 13 stamped out in U-shape, after tool cutting on the two edges of parallel grooves 14 in which engage the angled parts of the two element 11 and 12, the tightening shell being of the standard type 3, pressed by the assembly bolt 4.

In FIGURE 6, the U-shaped profile elements with angled part, constituting the pole, are shown at 11 and 12. The reference 15 designates the U-shaped profile element with an angled part assembled obliquely on the pole, 16 designates the triangulation plate, 17 a bracket with carrier shell member of the standard type, 18 a bracket with carrier shell of simplified type, 19 designates bracket with double carrier shell.

In FIGURE 7 the two parallel elements, one of which 20 is of U-shaped section with angled part, the other 21 of U-shaped section without angled part, are assembled together and orthogonally on the pole, as well as with a triangulation plate 22 by means of four brackets, the bracket 17 having a carrier shell of the standard type, the bracket 23 having double carrier shell and the brackets 24 and 25 being of the type with simplified carrier shell.

In FIGURE 8, two U-shaped profile elements with angled part are shown at 26 and 27, assembled by two brackets of which the carrier shell is of the simplified type.

In FIGURE 9 the two carrier shells are shown at 28 and 29, and at 30 the tightening shell, at 31 the assembly bolt of a bracket of the invention with double carrier shell for the assembly on a member 32 of trellis work of vertical members 33 and 34 and diagonal members 35 and 36.

In FIGURE 10 the carrier shell constitutes at the same time the head of the assembly bolt.

I claim:

1. A clamping device for structural assembly of metal profile pieces without welding or rivetting, each of the pieces having a web and at least one angled part projecting from the web, said device comprising: a carrier member having two pair of parallel grooves formed in one surface thereof to receive the angled parts of at least two profile pieces to be joined in an assembly, each pair of said grooves intersecting the other at right angles, a tightening member having a surface to engage the profile pieces on the surface thereof opposite said carrier member, and a clamping member disposed centrally of said carrier and said tightening member to draw these latter two members toward each other against the profile pieces therebetween.

2. A clamping device for structural assembly of metal profile pieces without welding or rivetting, each of the pieces having a web and at least one angled part projecting from the web, said device comprising: a carrier member of U-shaped cross-section to establish a web and a pair of parallel flange portions, said flange portions each having a pair of spaced slots formed therein to receive the angled parts of two profile pieces to be joined in parallel relationship, a tightening member having surface to engage the profile pieces on the surface thereof opposite said carrier member, and a clamping member disposed centrally of said carrier and said tightening member to draw these latter two members toward each other against the profile pieces therebetween.

3. In a structural assembly of at least three metal profile pieces, each of said pieces having a web and at least one angled part projecting from the web, a plurality of carrier members each having two pair of parallel grooves formed in at least one surface thereof respectively to receive the angled parts on said profile pieces, the respective grooves in said carrier members intersecting each other at right angles, and there being at least one of said carrier members between each of two of said profiles, a tightening member having a surface to engage an outer one of the profile pieces on the side of said outer profile piece opposite a carrier member, and a single clamping member extending centrally through said carrier members and said tightening member to draw the assembly of said profile pieces, carrier members and said tightening member firmly against one another.

4. In an orthogonal assembly of two pairs of metal profile pieces, each of said pieces having a web and an angled portion, and wherein said pieces are arranged with the web portions of each pair in facing engagement and with the angled portions of the pieces directed outwardly, means for clamping said profile pieces firmly to one another, said means comprising a pair of carrier members each having a surface shaped to establish a pair of spaced grooves to receive the angled part of each pair of profile members respectively and a single clamping member extending centrally through said carrier members to draw said carrier members against one another on said profile pieces.

5. The apparatus recited in claim 4 wherein said carrier members are circular in shape and wherein said one surface therein has two pair of parallel grooves, the respective pairs of grooves intersecting each other at right angles.

6. The apparatus recited in claim 4 wherein said carrier members are of U-shaped cross-section to establish a web and a pair of parallel flange portions, said flange portions each having a pair of spaced slots formed therein to establish said grooves.

7. The apparatus recited in claim 4 wherein one of the said profile pieces in one of said pairs is a triangulation member to strengthen the assembly of the other profile piece of said one pair to the other pair of profile pieces.

References Cited

UNITED STATES PATENTS 2,692,033   10/1954   Jaynes _____ 287—36

FOREIGN PATENTS 5,947   3/1894   Great Britain.
408,909   4/1934   Great Britain.
454,759   3/1949   Canada.
1,037,008   4/1953   France.

REINALDO P. MACHADO, *Primary Examiner.*

HARRISON R. MOSELEY, *Examiner.*

A. I. BREIER, *Assistant Examiner.*

UNITED STATES PATENT OFFICE
CERTIFICATE OF CORRECTION

Patent No. 3,357,731                      December 12, 1967

Maurice Piget

It is hereby certified that error appears in the above numbered patent requiring correction and that the said Letters Patent should read as corrected below.

Column 4, line 13, for "each of two of said profiles" read -- each two of said profile pieces --.

Signed and sealed this 4th day of February 1969.

(SEAL)
Attest:

Edward M. Fletcher, Jr.

Attesting Officer

EDWARD J. BRENNER

Commissioner of Patents